United States Patent [19]

Su et al.

[11] Patent Number: 5,288,873

[45] Date of Patent: Feb. 22, 1994

[54] AMINATED ALKOXYLATED IMIDAZOLIDONES

[75] Inventors: Wei-Yang Su; Michael Cuscurida; Terry L. Renken, all of Austin, Tex.

[73] Assignee: Texaco Chemical Company, White Plains, N.Y.

[21] Appl. No.: 928,582

[22] Filed: Aug. 13, 1992

[51] Int. Cl.$^5$ .................. C07D 233/04; C07D 233/32
[52] U.S. Cl. .................. 548/323.5; 525/407
[58] Field of Search .................. 548/320, 323.5

[56] References Cited

U.S. PATENT DOCUMENTS

| | | | |
|---|---|---|---|
| 3,116,967 | 1/1964 | Goldstein et al. | 548/323.5 X |
| 3,226,379 | 12/1965 | Steyermark | 548/323.5 X |
| 3,509,085 | 4/1970 | Sekmakas | 548/323.5 X |
| 3,896,088 | 7/1975 | Raynolds | 548/323.5 X |
| 4,526,915 | 7/1985 | Sekmakas et al. | 548/320 |
| 4,883,873 | 11/1989 | Abboud et al. | 548/320 |

FOREIGN PATENT DOCUMENTS

| | | | |
|---|---|---|---|
| 1130822 | 6/1962 | Fed. Rep. of Germany | 548/323.5 |
| 1556612 | 2/1969 | France | 548/323.5 |
| 53-98965 | 8/1978 | Japan | 548/323.5 |

Primary Examiner—Floyd D. Higel

Attorney, Agent, or Firm—James L. Bailey; Kenneth R. Priem; Cynthia L. Kendrick

[57] ABSTRACT

Disclosed is a novel polyetherdiamine comprising an aminated, alkoxylated 1,2'-hydroxyethyl-2-imidazolidone represented by the formula:

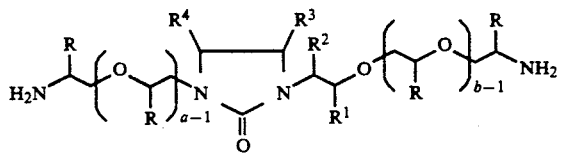

where R is H or an alkyl group of from 1 to 16 carbon atoms, $R^1$, $R^2$, $R^3$ and $R^4$ are selected from the group consisting of hydrogen and lower alkyl radicals having about 1 to 4 carbon atoms, and $a+b=n$, wherein n is a number of from about 2 to 80, prepared by reacting urea or certain carbonates with an aminoalkoxylamine, alkoxylating the product with alkylene oxide to form a polyol which is reductively aminated to form a novel polyetherdiamine containing an imidazolidone (cyclic urea).

7 Claims, No Drawings

AMINATED ALKOXYLATED IMIDAZOLIDONES

BACKGROUND OF THE INVENTION

Cross-Reference

This application is related to allowed U.S. application Ser. No. 07/928,583, filed of even date and now U.S. Pat. No. 5,250,632.

Field Of The Invention

This invention relates to polyetherdiamines and, more particularly, this invention relates to novel curing compositions comprising aminated polyols derived from imidazolidones. In this sequence aminoethyle-thanolamine is reacted with urea to produce 1-2'-hydroxyethyl-2-imidazolidone (HEIMD) which is alkoxylated to prepare a polyol and the polyol is subsequently reductively aminated to produce the novel polyetherdiamine composition containing the imidazolidone group (cyclic urea).

These novel polyetherdiamines, containing cyclic urea, produce elastomers with good properties and can be used alone or in combination with known polyoxyalkyleneamines as curing agents for epoxy resins.

Employing these polyetherdiamines it is possible to prepare curing agents having a broad range of molecular weights, useful in a variety of epoxy polyurea and polyamide applications. The variety of possible combinations and molecular weights can result in a broad range of physical properties in cured products.

RELATED ART

The amination of long alkoxylated alkyl chains terminated by hydroxyl groups is well-known in the art.

U.S. Pat. No. 3,654,370 to E. L. Yeakey teaches the amination of polyoxyalkylene polyols to form the corresponding amines by means of ammonia and hydrogen over a catalyst prepared by the reduction of a mixture of the oxides of nickel, copper and chromium. The amination is carried out at a temperature of 150° to 275° C. and 500 to 5000 psig.

A number of patents describe catalysts for producing primary or secondary amines. See, for example:

U.S. Pat. No. 4,766,245—(Raney Nickel) to Larkin & Renken;
U.S. Pat. No. 4,152,345 & 4,153,581 to Habermann;
U.S. Pat. No. 4,409,399 to H. E. Swift et al.;
U.S. Pat. No. 3,390,184 to P. H. Moss et al.;
U.S. Pat. No. 3,373,204 to R. A. Hales et al.;
U.S. Pat. No. 3,347,926 to J. D. Zech;
U.S. Pat. No. 4,014,933 to Boettger et al.;
U.S. Pat. No. 4,973,761 to Schoenlëben & Mueller; and
U.S. Pat. No. 5,003,107 to Zimmerman & Larkin.

Though methods are disclosed in the art for aminating polyols and for catalysts to accomplish amination, it does not appear from any available art that there has been disclosed the preparation of a diamine composition as disclosed herein which contains an imidazolidone group, nor does there appear to be any suggestion of a cyclic urea within a polyetherdiamine which is useful in polyurea and polyamide applications.

SUMMARY OF THE INVENTION

This invention relates to the preparation of a compound of the formula:

wherein R is H or an alkyl group of from 1 to 16 carbon atoms, $R^1$, $R^2$, $R^3$ and $R^4$ are selected from the group consisting of hydrogen and lower alkyl radicals having about 1 to 4 carbon atoms, and $a+b=n=$ the number of moles of alkylene oxide used in the alkoxylation step and to the use of said compound in epoxy, polyamide and polyurea applications.

The process for preparing the compounds of this invention comprises:

1. Preparation of hydroxyalkyl-2-imidazolidones from urea and the corresponding aminoalkoxylamine demonstrated in Example 1 and represented by:

It may be noted that other possible feedstock which can be used instead of urea include dimethyl carbonate and ethylene carbonate.

2. Alkoxylation of a 1-2'-hydroxyalkyl-2-imidazolidone with an alkylene oxide to produce a polyol, as represented by:

3. Reductive amination of the polyol of (2) to form a novel polyetherdiamine containing an imidazolidone and, therefore, a cyclic urea, as represented by:

wherein $R^1$, $R^2$, $R^3$, and $R_4$ are selected from the group consisting of hydrogen and lower alkyl radicals having from about 1 to 4 carbon atoms, R is H or an alkyl group of from 1 to 16 carbon atoms, and $a+b=n$, wherein n is from about 2 to 80.

The products of this invention are useful as epoxy curing agents, and in polyamide and polyurea applications. They may be reacted with multifunctional epoxy resins to produce tough, flexible materials. The amines may be used as the sole epoxy curative or blended with other known epoxy curatives to modify resin properties. This is discussed further in copending U.S. application Ser. No. 07/928,583, now U.S. Pat. No. 5,250,632 incorporated herein by reference in its entirety.

DESCRIPTION OF THE PREFERRED EMBODIMENT

The sequence for preparing the novel imidazolidone containing polyetherdiamines, starting with the substituted imidazolidone, can be represented best by the following:

1-2'-hydroxypropyl-4, 5-dimethyl-2-imidazolidone and 1-2'-hydroxy-1'-methylpropyl-2-imidazolidone.

The alkoxylation reaction employed to prepare the propylene oxide adduct of the cyclic urea initiator utilized to prepare the compounds of this invention is carried out according to methods well-known in the art, as described in Examples 2–3 and Table I.

The alkoxylation proceeds using alkylene oxides containing 2 to 16 carbon atoms, or combinations thereof. Particularly suitable are ethylene oxide, propylene oxide and butylene oxide or combinations thereof. It can be noted from Table I that variations in the number of moles of alkylene oxides or mixtures thereof used in alkoxylation result in predictably different hydroxyl number products, expressed as mg KOH/g, for the resulting polyols which seems to likewise result in vari-

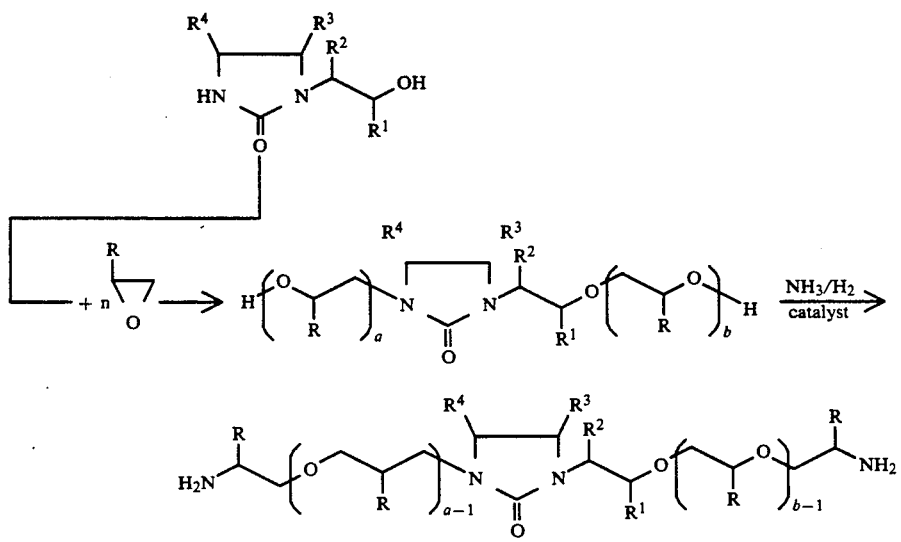

where R is H or an alkyl of 1 to 16 carbon atoms, $R^1$, $R^2$, $R^3$ and $R^4$ are selected from the group consisting of hydrogen and lower alkyl radicals having about from 1 to 4 carbon atoms, n is the number of moles of alkylene oxide employed in alkoxylation and $a+b=n$, wherein n is from about 2 to 80.

The initiator, 1-hydroxyalkyl-2-imidazolidone, can be easily prepared by reacting urea, dimethyl carbonate, ethylene carbonate or propylene carbonate with the corresponding aminoalkylalkanolamine and is represented by the structure:

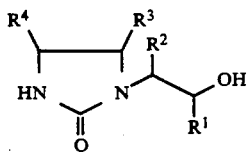

wherein $R^1$, $R^2$, $R^3$, and $R^4$ are selected from the group of hydrogen and lower alkyl radicals having from 1 to 4 carbon atoms. Examples of 1-2'-hydroxyalkyl-2-imidazolidones that are suitable initiators in the desired synthesis of polyols include
1-2'-hydroxyethyl-2-imidazolidone,
1-2'-hydroxypropyl-2-imidazolidone,
1-2'-hydroxyethyl-4-methyl-2-imidazolidone,
1-2'-hydroxyethyl-5-methyl-2-imidazolidone,
1-2'-hydroxyethyl-4,5-dimethyl-2-imidazolidone, ations in the properties observed in the elastomers produced using the novel polyetherdiamines.

The alkoxylated substituted HEIMD products can be converted to the corresponding primary amines by reaction with ammonia over a hydrogenation/dehydrogenation catalyst. Generally reductive amination catalysts are composed primarily of nickel, cobalt or copper, or these metals in combination as the active components. The catalyst can contain other metals as well, such as iron, zinc, chromium, manganese, zirconium, molybdenum, tungsten, rhenium, and ruthenium. Other promoters such as barium, magnesium, and phosphorous have been used in reductive amination catalysts. Precious metals such as platinum and palladium have also been used in some catalysts. The catalysts can be unsupported or supported. Common supports that have been used for these catalysts include alumina, silica, silica-alumina, zirconia, magnesia, and titania.

In the examples of reductive amination described herein the catalysts used comprised (1) nickel and copper on alumina and (2) nickel, copper, chromium, and molybdenum supported on alumina. The quantity of nickel compound and copper, along with chromium and molybdenum which are employed in the catalyst may vary. Good results are observed where the catalyst consisted essentially of 10–40 wt % nickel, 2–25 wt % copper and 0.1 to 2 wt % each of chromium and molybdenum as well as at least 50 wt % of the refractory metal oxide support. A preferred catalyst composition comprises 15 to 30 wt % nickel, 3-20 wt % copper and 0.5 to 10 wt % each of chromium and molybdenum.

It was observed that no significant amount of product degradation occurred during the amination reactions. A number of other catalysts known in the art to be active in reductive amination, such as, for example, Raney nickel would be expected to be active and selective and, therefore, useful in this reaction.

The temperature for the amination of the polyol should be in the range of 150° C.-350° C. and is preferably from 180° C. to 240° C.

The pressure for amination should be in the range from 500 to 4000 psig and preferably from 1500 to 2500 psig.

The following examples which illustrate the nature of the instant invention are not intended to be limitative.

EXAMPLE 1

Preparation of 1-2′-hydroxyethyl-2-imidazolidone

A five-liter three-necked flask equipped with a thermometer, condenser, stirrer and nitrogen inlet was charged with aminoethylethanolamine (1560 g, 15 mole) and urea (900 g, 15 mole). The reaction mixture was heated to 125° C. for 7 hours and then 150° C. until no more gas releasing was observed. About 1945 g of product was obtained. The product was confirmed by NMR spectrum to be 1-2′-hydroxyethyl-2-imidazolidone.

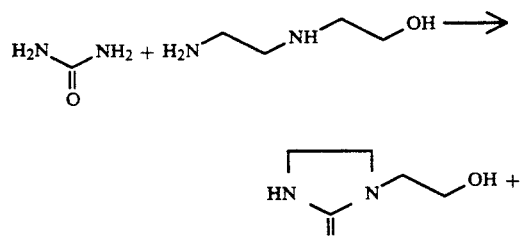

EXAMPLES 2-6

These examples will show the preparation of polyols from 1-2′-hydroxyethyl-2-imidazolidone (HEIMD). These products were prepared using the following reaction sequence:

| Products | | Hydroxyl No., mg KOH/g |
|---|---|---|
| HEIMD + 10.7 PO | → | 150.0 OH no. polyol |
| HEIMD + 4 EO + 2 PO | → | 245.0 OH no. polyol |
| HEIMD + 10 EO + 3 PO | → | 142.8 OH no. polyol |
| HEIMD + 5 PO | → | 271.0 OH no. polyol |
| HEIMD + 2.5 PO | → | 414.7 OH no. polyol |
| HEIMD + 37.5 PO | → | 58.4 OH no. polyol |

Reaction charges, details of preparation and properties of these products are given in Table 1.

EXAMPLE 7

Amination of Alkoxylated Imidazolidone 6855-80

The amination was performed in a 100 cc tubular reactor fully charged with 77.4 g of a supported Ni-Cu/Al$_2$O$_3$ catalyst, (29.7% Ni, 8.7% Cu on 1/25″ γ alumina extrudates). Polyol (6855-80), ammonia and hydrogen were each continuously fed to the heated reactor. Reactor pressure was maintained with a back pressure regulator. Reactor effluent samples were stripped of ammonia and water prior to analysis or testing. Results, along with reactor conditions, are shown in the table below.

| Sample 6826-9- | 2B | 3B |
|---|---|---|
| Pressure, psig | 2005 | 2035 |
| Mid Rx Temp, °C. | 230 | 240 |
| Polyol, g/hr | 60.0 | 62.0 |
| Ammonia, g/hr | 63.0 | 91.0 |
| H$_2$, l/hr (STP) | 7.0 | 7.0 |
| Acetylatables, meq/g | 4.870 | 4.890 |
| Total Amine, meq/g | 2.760 | 3.200 |
| Primary Amine, meq/g | 2.570 | 3.000 |
| Secondary Amine (c), meq/g | 0.190 | 0.200 |
| % Conversion[a] | 56.67 | 65.44 |
| % Selectivity[b] | 93.12 | 93.75 |

$$^a\% \text{ Conversion} = \left(\frac{\text{total amine}}{\text{acetylatables}}\right) \times 100$$

$$^b\% \text{ Selectivity} = \left(\frac{\text{Primary amine}}{\text{Total amine}}\right) \times 100$$

EXAMPLE 8

Amination of Alkoxylated Imidazolidone 6855-84

The amination was performed in a 100 cc tubular reactor fully charged with 65.2 g of a 1/25 inch diameter extruded catalyst composed of 38.4% Ni, 5.9% Cu, 1.1% Cr and 0.62% Mo on an alumina support. The 142.8 hydroxyl number polyol (6855-84), ammonia and hydrogen were each continuously fed to the heated reactor. Reactor pressure was maintained with a back pressure regulator. Reactor effluent samples were stripped of ammonia and water prior to analysis or testing. Results along with reactor conditions are shown in the table below.

| Sample 6826-10- | 1 | 2 | 3 | 4 |
|---|---|---|---|---|
| Pressure, psig | 2045 | 2050 | 2025 | 2050 |
| Mid Rx Temp, °C. | 211 | 221 | 230 | 225 |
| Polyol, g/hr | 103.0 | 103.0 | 102.0 | 103.0 |
| Ammonia, g/hr | 129.0 | 124.0 | 127.0 | 131.0 |
| H$_2$, l/hr (STP) | 9.4 | 9.4 | 9.4 | 9.4 |
| Acetylatables, meq/g | 2.700 | 2.700 | 2.700 | 2.670 |
| Total Amine, meq/g | 2.310 | 2.540 | 2.560 | 2.562 |
| Primary Amine, meq/g | 2.270 | 2.460 | 2.480 | 2.506 |
| Secondary Amine, meq/g | 0.040 | 0.080 | 0.080 | 0.056 |
| % Conversion[a] | 85.56 | 94.07 | 94.81 | 95.96 |
| % Selectivity[b] | 98.27 | 96.85 | 96.88 | 97.81 |

$$^a\% \text{ conversion} = \left(\frac{\text{Total Amine}}{\text{Acetylatables}}\right) \times 100$$

$$^b\% \text{ selectivity} = \left(\frac{\text{Primary amine}}{\text{Total Amine}}\right) \times 100$$

TABLE 1

Alkylene Oxide Adducts of 1-2'-Hydroxyethyl-2-Imidazolidone (HEIMD)

| Sample No. | 6910–13 | 6855–80 | 6855–84 | 6915–56 | 6910–62 | 6915–87 |
|---|---|---|---|---|---|---|
| Charge | | | | | | |
| HEIMD, lb. | 4 | 4 | 4 | 8 | 15[c] | 18[a] |
| Potassium hydroxide, g[a] | 27.2 | 18.1 | 18.1 | 36 | 43.2 | 157 |
| Ethylene oxide, lb | — | 5.4 | 13.5 | — | — | — |
| Propylene oxide, lb | 19.1 | 3.6 | 5.4 | 17.8 | 16.7 | 72 |
| Magnesol 30/40, g[b] | 218 | 181 | 144 | 290 | 350 | 122.5 |
| Reaction Details | | | | | | |
| Oxide addition time, hr | 3.5 | 3.1 | 2.1 | 4.5 | 0.75 | 10.75 |
| Temperature, °C. | 110–115 | 110–115 | 110–115 | 110–115 | 110–115 | 110–115 |
| Pressure, psig, max | 50 | 50 | 50 | 38 | 58 | 50 |
| Properties | | | | | | |
| Hydroxyl no., mg KOH/g | 150 | 245 | 142.8 | 271 | 414.7 | 58.4 |
| Water, wt % | 0.04 | 0.05 | 0.033 | 0.06 | 0.08 | 0.04 |
| pH in 10:6 isopropanol-water | 8.4 | 9.4 | 8.8 | 8.9 | 10.6 | 9.4 |
| Color, Pt—Co | 125 | 125 | 175 | 250 | 75 | 125 |
| Sodium, ppm | 0.5 | 2.9 | 0.7 | 1.4 | 3.0 | 6.2 |
| Potassium, ppm | 1.1 | 1.0 | 2.6 | 1.7 | 4.8 | 4.7 |
| Viscosity, °F., cs | | | | | | |
| 77 | 441 | 453 | 320 | 867 | 873 | 513 |
| 100 | 184 | 116 | 76.3 | 311 | 524 | 242 |

[a]added as 45% aqueous solution; dried to water content of less than 0.1% prior to oxide addition.
[b]Added as aqueous slurry.
[c]400 mm PO adduct of HEIMD

EXAMPLE 9

Amination of Heimd + Po Polyol 6915-56 (NB 6826-17)

The amination was performed in the same reactor and with the same catalyst as that described in Example 8. Polyol, (6915-56), ammonia and hydrogen were continuously fed to the reactor at rates of 100 g/hr, 125 g/hr, and 9.4 1/hr (at STP). The reactor was heated to 230° C. and the reactor pressure was kept near 2000 psig. Product was collected over 69 hours of operation. The material was stripped of ammonia, water and other lights and then analyzed to give the following data:

| | |
|---|---|
| Acetylatables, meq/g | 4.78 |
| Total Amine, meq/g | 4.64 |
| Primary Amine, meq/g | 4.59 |
| Water, wt % | 0.04 |

EXAMPLE 10

Amination of Heimd + 10.7 Po Polyol 6910-13 (NB 6880-6)

The amination was performed in the same reactor and with the same catalyst as that described in Example 8. Polyol (6910-13), ammonia and hydrogen were continuously fed to the reactor at rates of 100 g/hr, 125 g/hr and 9.4 1/hr (at STP). The reactor was heated to 225° C. and the reactor pressure was kept near 2000 psig. Product was collected over 83 hours of operation. The material was stripped of ammonia, water and other lights and then analyzed to give the following data:

| | |
|---|---|
| Acetylatables, meq/g | 2.72 |
| Total Amine, meq/g | 2.62 |
| Primary Amine, meq/g | 2.60 |

EXAMPLE 11

Amination of 2000 MW Po Adduct of Heimd 6915-87 (NB 6880-13)

The amination was performed in a 1200 cc tubular reactor fully loaded with the same catalyst as that described in Example 8. Polyol (6915-87), ammonia and hydrogen were continuously fed to the reactor at rates of 2.20 lb/hr, 2.75 lb/hr, and 72 1/hr (at STP). The reactor was heated to 220° C. and the reactor pressure was kept near 2000 psig. Product was collected over 30 hours of operation. The material was stripped of ammonia, water and other lights and then analyzed to give the following data:

| | |
|---|---|
| Acetylatables, meq/g | 1.07 |
| Total Amine, meq/g | 1.05 |
| Primary Amine, meq/g | 1.04 |

EXAMPLE 12 (6835-73)

Usage Example

To a small cup was added 40 g of the sample of Example 5 (6826-10-4) and 14.8 g of ISONATE® 143L. ISONATE® 143L is pure MDI isonate modified so that it is liquid at ambient temperatures. It is a product of the Upjohn Co. After stirring with a tongue depressor, a tough elastomer was obtained.

What is claimed is:

1. A compound of the formula:

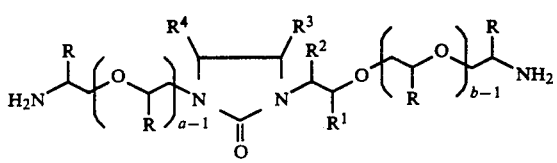

wherein R is H or alkyl having 1 to 16 carbon atoms, $R^1$, $R^2$, $R^3$, and $R^4$ are selected from the group consisting of hydrogen and lower alkyl having from 1 to 4 carbon atoms, and a+b equals n, a number having a value of from 2 to 80 resulting from the reductive amination of a polyol.

2. The compound of claim 1 wherein the polyol is the alkoxylated product of a hydroxyalkyl-2-imidazolidone represented by the formula:

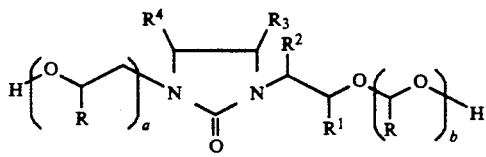

wherein R is H or an alkyl group having 1 to 16 carbon, $R^1$, $R^2$, $R^3$ and $R^4$ are selected from the group consisting of hydrogen and lower alkyl radicals having from 1 to 4 carbon atoms and a+b=n, a positive integer from 2 to 80.

3. The compound of claim 2 wherein the hydroxyalkyl-2-imidazolidone has the formula:

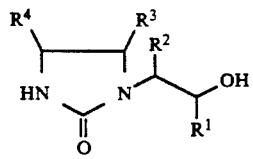

wherein $R^1$, $R^2$, $R^3$, and $R^4$ are selected from the group consisting of hydrogen and lower alkyl radicals having from 1 to 4 carbon atoms.

4. The compound of claim 3 wherein the hydroxyalkyl-2-imidazolidone is selected from the group consisting of 1-2' hydroxethyl-2-imidazolidone, 1-2'-hydroxypropyl-2-imidazolidone, 1-2'-hydroxyethyl-4-methyl-2-imidazolidone, 1-2'-hydroxyethyl-5-methyl-2-imidazolidone, 1-2'-hydroxyethyl-4,5-dimethyl-2-imidazolidone, 1-2'-hydroxypropyl-4,5-dimethyl-2-imidazolidone, and 1-2'-hydroxy-1'-methylpropyl-2-imidazolidone.

5. The compound of claim 4 wherein the hydroxyalkyl-2-imidazolidone is 1-2'-hydroxyethyl-2-imidazolidone.

6. The compound of claim 3 wherein the 1-2'-hydroxyalkyl-2-imidazolidone is alkoxylated with an alkylene oxide from the group consisting of ethylene oxide, propylene oxide and butylene oxide or mixtures thereof.

7. The compound of claim 6 wherein the alkylene oxide is propylene oxide.

* * * * *